Dec. 2, 1930.    J. S. GEORGE ET AL    1,783,188
METHOD OF COATING METAL ARTICLES
Original Filed Aug. 11, 1925    5 Sheets-Sheet 1
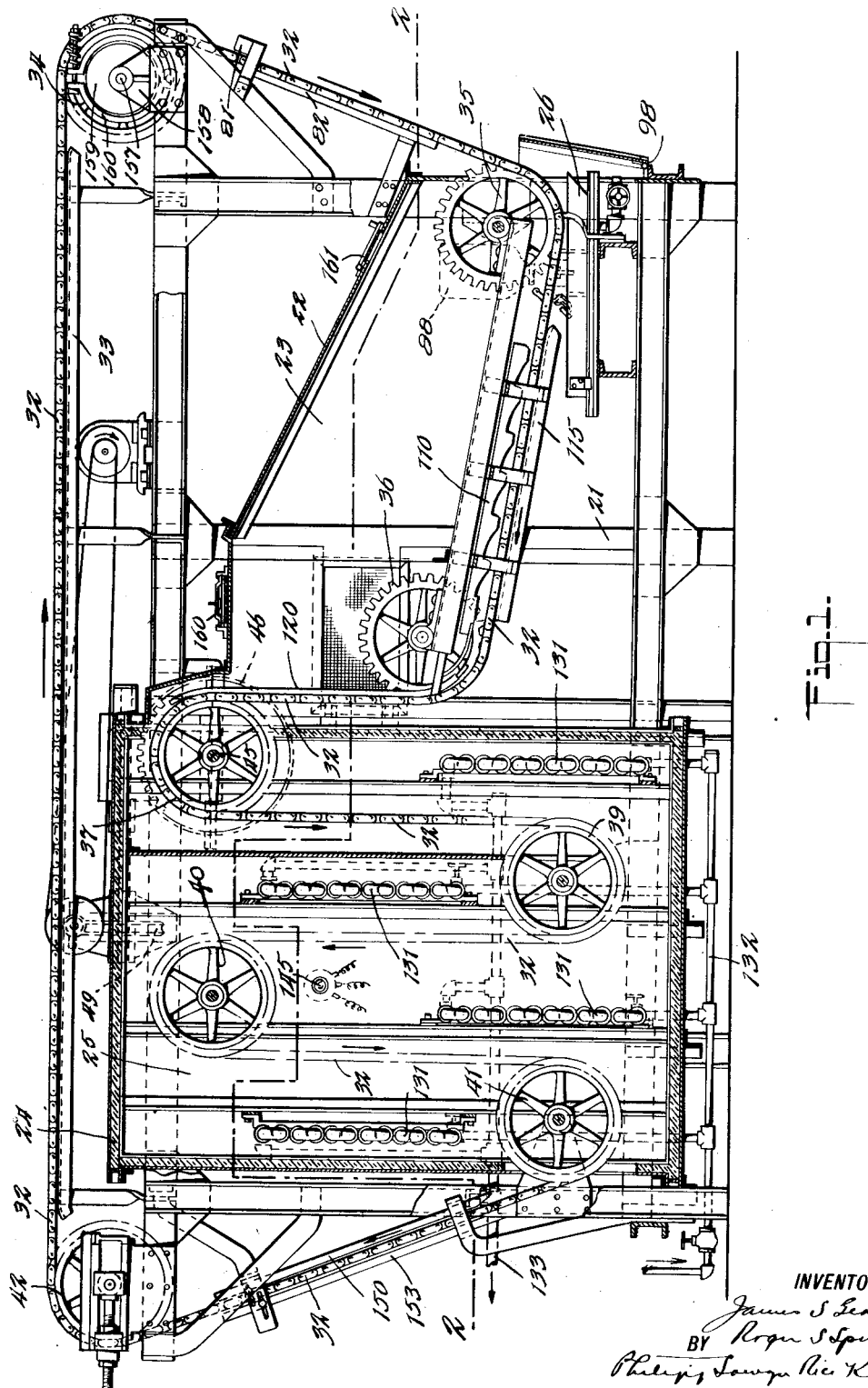

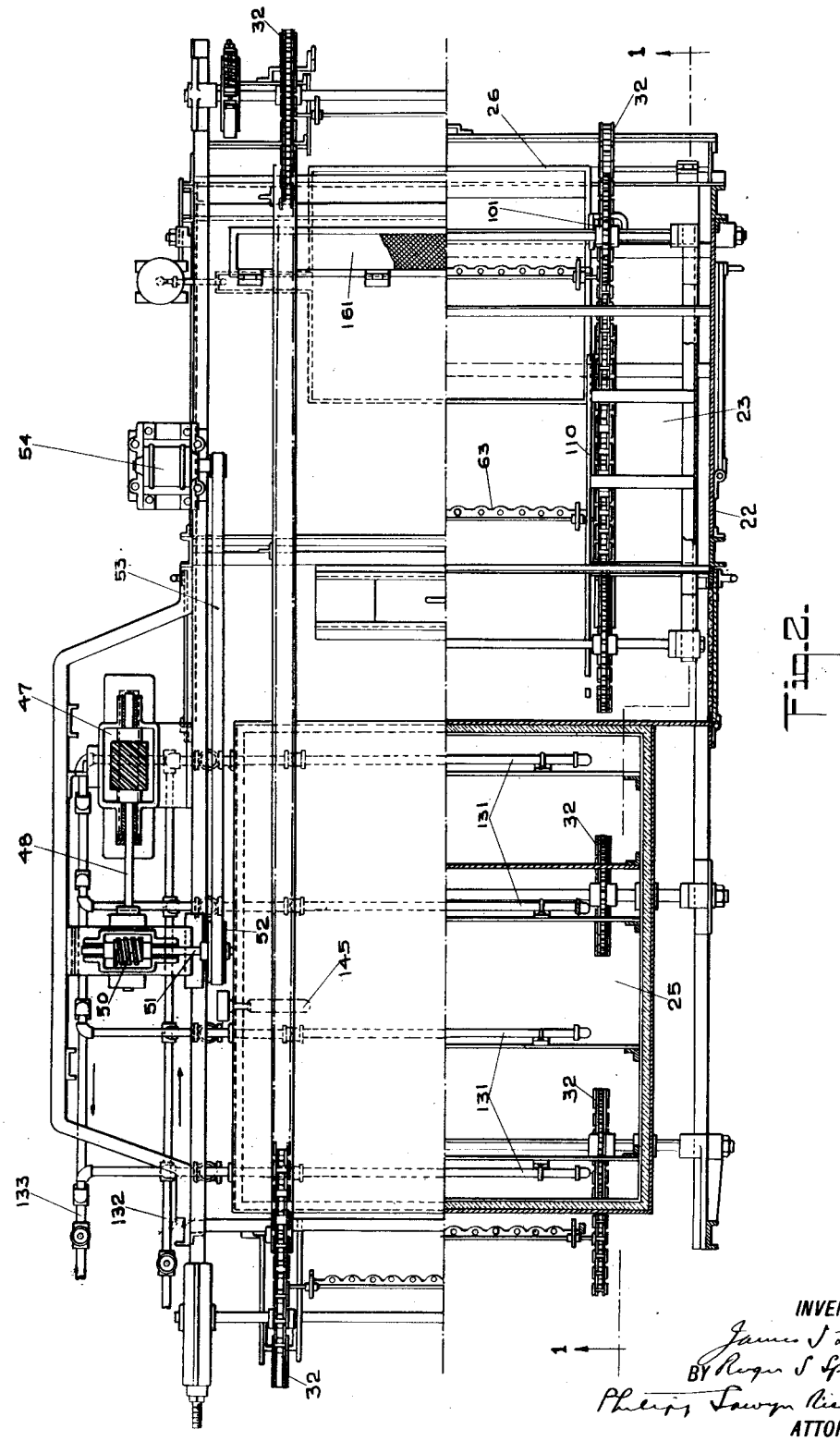

Dec. 2, 1930.    J. S. GEORGE ET AL    1,783,188
METHOD OF COATING METAL ARTICLES
Original Filed Aug. 11, 1925    5 Sheets-Sheet 3
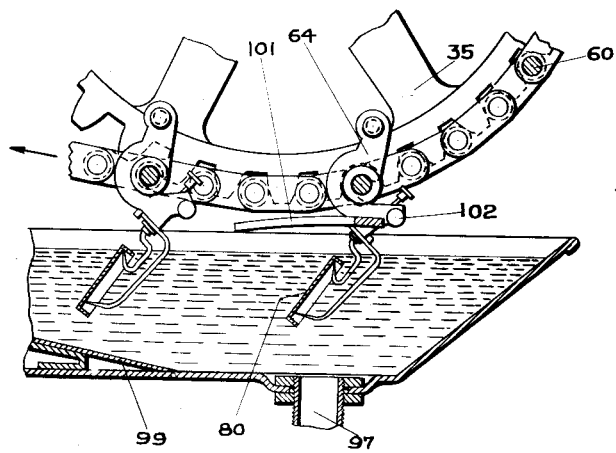
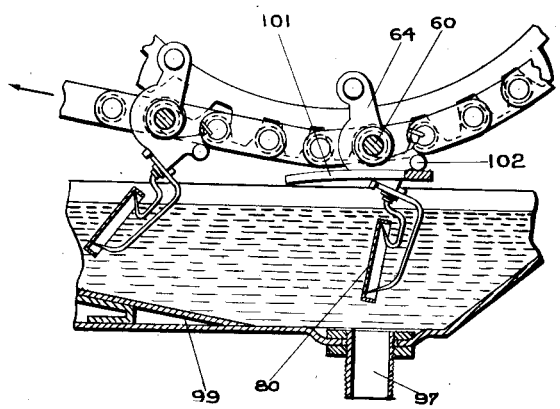
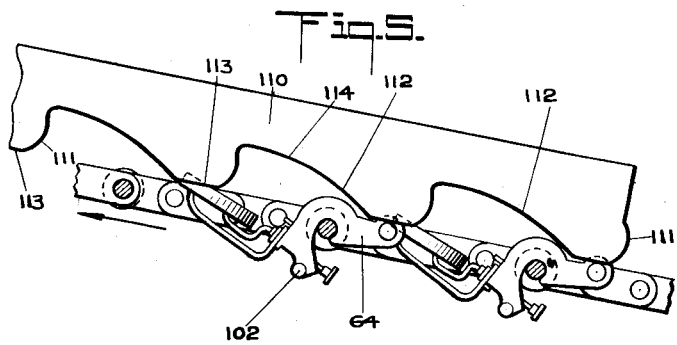
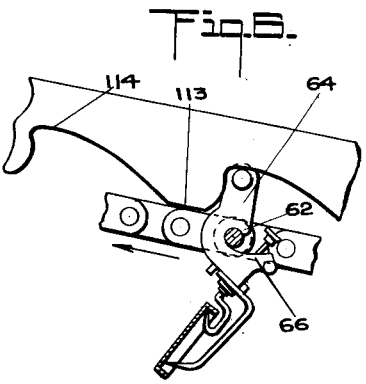
INVENTORS
James S. George
BY Roger S. Sperry
Phillips, Sawyer, Rice Kennedy
ATTORNEYS Dec. 2, 1930  J. S. GEORGE ET AL  1,783,188
METHOD OF COATING METAL ARTICLES
Original Filed Aug. 11, 1925   5 Sheets-Sheet 4
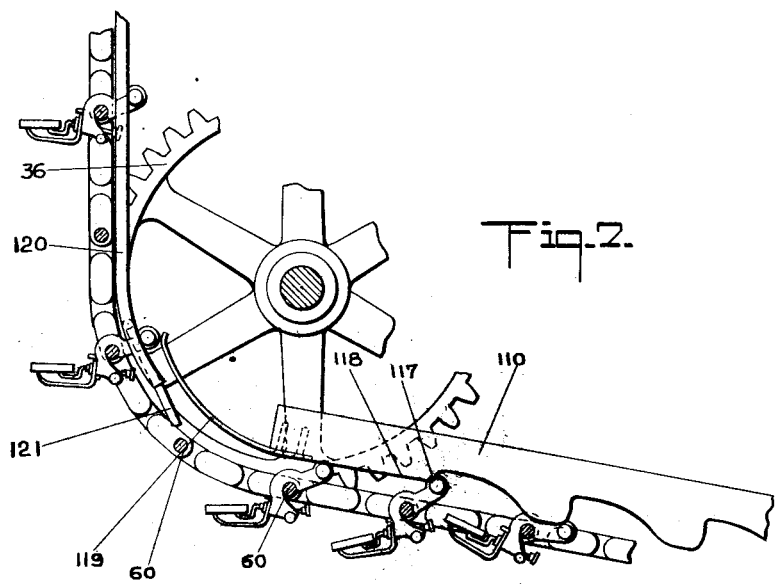
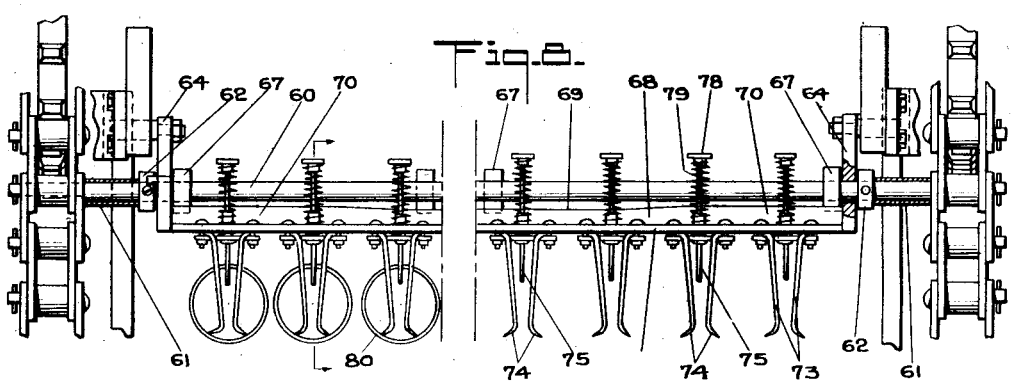
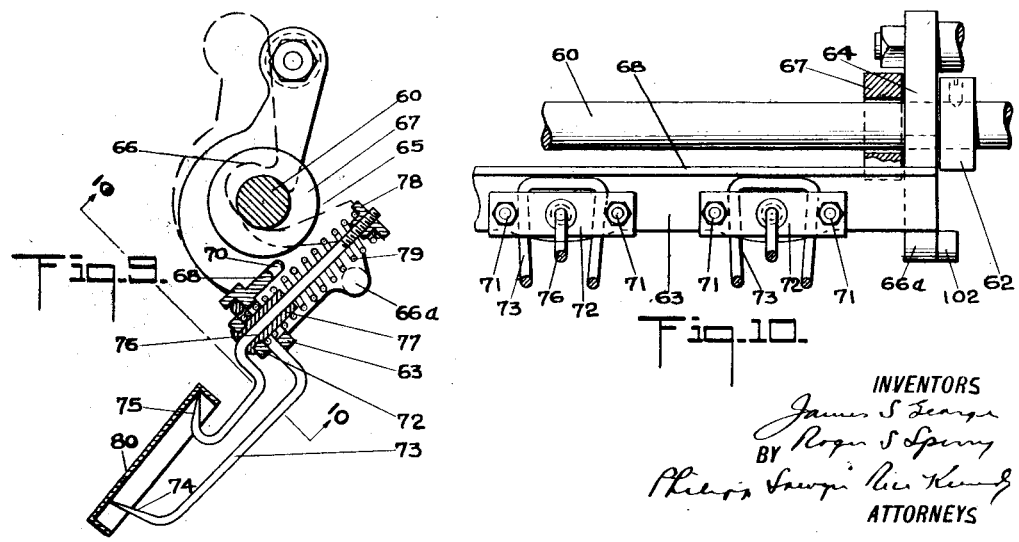
INVENTORS
James S. George
BY Roger S. Sperry
ATTORNEYS Dec. 2, 1930.  J. S. GEORGE ET AL  1,783,188
METHOD OF COATING METAL ARTICLES
Original Filed Aug. 11, 1925  5 Sheets-Sheet 5
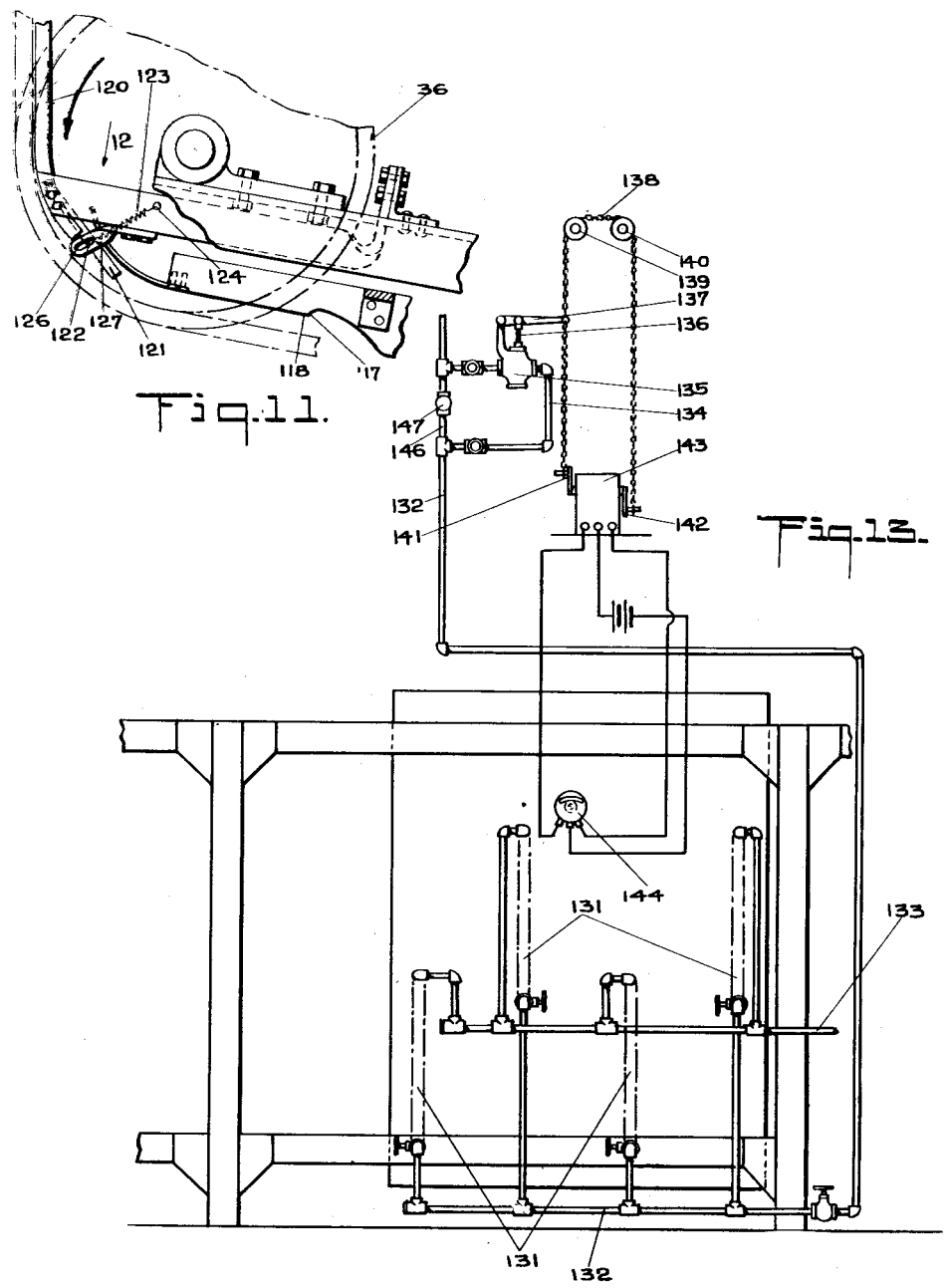
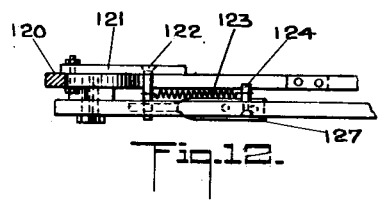
INVENTORS
ATTORNEYS Patented Dec. 2, 1930

1,783,188

UNITED STATES PATENT OFFICE

JAMES S. GEORGE AND ROGER S. SPERRY, OF WATERBURY, CONNECTICUT, ASSIGNORS TO SCOVILL MANUFACTURING COMPANY, OF WATERBURY, CONNECTICUT, A CORPORATION OF CONNECTICUT

METHOD OF COATING METAL ARTICLES

Original application filed August 11, 1925, Serial No. 49,524. Divided and this application filed December 23, 1926. Serial No. 156,620.

This invention relates to a method of coating metal articles and more particularly for coating metal articles by dipping the same in a lacquer bath.

The present application is a division from an application filed August 11, 1925, Serial No. 49,524.

It is an object of the invention to provide a method of coating articles such that the finished articles have a uniformly even coating of the proper thickness and free from blemishes.

With this general object in view the invention consists in the method which will first be described in connection with the accompanying drawings, and then more particularly pointed out.

In the drawings—

Figure 1 is a sectional view taken on the broken line 1—1 of Fig. 2, with parts indicated diagrammatically and parts omitted, of an apparatus suitable for carrying out the method;

Figure 2 is a sectional view taken on the broken line 2—2 of Fig. 1, with parts broken away and certain parts omitted;

Figure 3 is a detail view showing, in vertical section and enlarged, a portion of the apparatus at the dipping station;

Figure 4 is a similar view of a different position of the parts;

Figures 5 and 6 are fragmentary views showing, in vertical section, two positions of the parts just beyond the dipping station;

Figure 7 is a similar view (reduced) showing the parts just beyond the positions of Figs. 5 and 6;

Figure 8 is a detail view (enlarged) showing, in side elevation and partly in section, one rack unit;

Figure 9 is a sectional view (enlarged) taken on the line 9—9 of Fig. 8, looking in the direction of the arrow;

Figure 10 is a sectional view taken on the line 10—10 of Fig. 9, looking in the direction of the arrow;

Figure 11 is a fragmentary view showing in side elevation with parts broken away and parts in section and parts indicated diagrammatically, that portion of the apparatus shown in Fig. 7;

Figure 12 is a fragmentary sectional view looking in the direction of the arrow 12 of Fig. 11; and, Figure 13 is a diagrammatic view of the heating system and control.

According to the method of the present invention, the articles to be coated are submerged in a bath of the coating material. For convenience of description the material is referred to in the specification and claims as lacquer but it is to be understood that the term lacquer is used in a general and comprehensive sense and is intended to include various forms of lacquer and analogous coating materials. While the articles to be coated may vary, the invention is particularly applicable to metal shell-like articles such as box parts.

After the articles have remained in the bath a sufficient period they are withdrawn from the bath at a rate of emergence that bears a definite ratio to the rate of gravitational flow or drain of the lacquer on the emerging articles, and according to the best practice the articles will be withdrawn at a rate of emergence that is substantially equal to the rate of lacquer flow. It has been found that when the articles are withdrawn too slowly, in proportion to the rate of lacquer flow, or, conversely, when the lacquer flows too rapidly for a given rate of emergence, the portions of the articles first emerging do not have a proper coating as there is an excessive lacquer drainage or drag away from those portions. On the other hand, when the articles are withdrawn too rapidly in proportion to the rate of lacquer flow, or the lacquer flows too slowly for a given rate of emergence, the excess lacquer does not properly drain off, particularly at the portions of the articles last emerging. This results in thick spots that cause discoloration and other blemishes.

By withdrawning the articles as above described, these disadvantages are avoided. There is no excessive flow or sagging of the lacquer on the parts first emerging and the drainage of excess lacquer is sufficient to avoid thick spots. There is a clean break between the film and bath surface and retention of drops of lacquer at the points of the articles last emerging is avoided.

The relation between the rate of emergence and the lacquer flow may be maintained by varying the rate of emergence of the articles or the viscosity of the lacquer. The former may be regulated by varying the speed of the articles in their journey through the bath, the angle of the path of withdrawal, or the relative angular position of the articles in emerging. The viscosity of the bath may be regulated by controlling the temperature of the bath or by adding or subtracting thinning material to or from the bath.

In carrying out the invention in its entirety, the dipped articles are withdrawn while positioned at an angle to the horizontal and, immediately after withdrawal, while the lacquer is still unset, the position of the articles is reversed with respect to the horizontal, thereby to reverse the direction of the lacquer flow. According to what is now considered the best practice, the articles are rocked back and forth across the horizontal several times. This periodically reverses the direction of lacquer flow and spreads the lacquer in an even film during the period prior to setting of the lacquer. The articles are held at the end of each rocking movement a sufficient time to permit the lacquer to overcome inertia and start to reverse its flow. Since there may be some concentration of lacquer at the portions of the articles last emerging the articles may be held in the position opposite the position of emergence slightly longer than they are held in the position of emergence, in order to compensate for this concentration.

The articles are dried and the lacquer film given a final set by subjecting them to the action of heat. This is a step known in the art and needs no further description.

In carrying out the invention in its entirety, the articles, between the rocking or spreading operation and the final drying, are held in a horizontal position during what may be termed a preliminary setting period, i. e. a period in which the lacquer sets sufficiently to be non-fluent. By so holding the articles until the preliminary set is effected there is no danger of any creep in the film following the spreading operation, e. g. while the articles are being transported to a drying chamber.

In coating certain types of articles by dipping in a bath, namely, articles of a cup or shell shape, such as box parts, it often happens that a bubble of air is entrapped in the shell. For example, in dipping box parts this bubble of air is entrapped in the crevice between the body and rim of the box part. These air bubbles prevent access of the bath material to the spot where they occur and result in what are known as "dry spots" that mar the appearance of the finished article. In carrying out the method of the invention in its entirety the articles, while submerged in the bath, are shifted into a position to permit the escape of any entrapped air. The character of this movement will depend upon the nature of the article and its position of submergence. In any case, however, the article is moved into such a position that there is a free path for any air bubbles to flow upwardly to the surface of the bath. For example, when a box part or shell is submerged with its open face at an acute angle to the horizontal, a movement of the article to cause its open face to approach and slightly cross the vertical permits the escape of the entrapped air.

The drawings illustrate apparatus suitable for carrying out the method above described and the various steps will be further explained in connection with a description of this apparatus.

Referring to the drawings, in the embodiment illustrated as an example, supported by a main frame 21 is a housing 22 enclosing a dipping chamber 23 and a housing 24 enclosing a drying chamber 25, the two chambers being contiguous and having a common dividing wall. Near the bottom and outer end of the dipping chamber is a tank 26 for a lacquer bath, hereinafter referred to in more detail.

There is provided conveyor means for conveying the articles to be coated past the tank and to and through the drying chamber and this may conveniently be accomplished by an endless conveyor carrying article supports. As here shown as an example, the conveyor means comprises two parallel endless chains 32 moving as a unit. From one end of the top of the frame (the right end in Fig. 1) the chains take a downward and inward slant from duplicate guide sprockets 34 to guide sprockets 35 located adjacent the tank, where they enter the dipping chamber 23 through a suitable opening shown in Fig. 1. From sprockets 35 the chains pass obliquely upwardly to duplicate guide sprockets 36 and thence straight upwardly to duplicate sprockets 37, where they enter the drying chamber through a suitable opening in the dividing wall (Fig. 1). In the drying chamber the chains have a zig-zag course over duplicate guide sprockets 39, 40, 41. From the latter, the chains leave the drying chamber, through a suitable opening shown in Fig. 1, and take an upward outward slant to duplicate guide sprockets 42 from where they have an idle return across the top of the frame, supported by tracks 33, to the starting point, i. e. sprockets 34.

The downward slant just in advance of the entrance to the dipping chamber provides a convenient loading station and the upward slant beyond the drying chamber an uploading station.

While the chains may be driven in any suitable manner, in the present exemplification, sprockets 37 are drive sprockets. On a shaft 45 on which sprockets 37 are mounted, is a worm gear 46 meshing with a worm 47 (Fig. 2) on a shaft 48. This shaft is driven by a worm gear 49 meshing with a worm 50 on a cross shaft 51. The latter is rotated by a pulley 52 driven by belt 53 from a motor 54. The driving means described gives the chains a relatively slow predetermined speed. While the movement is continuous, it is slow enough to enable the articles to be loaded and unloaded as the chains pass the loading and unloading stations.

Pivotally mounted on the conveyor means are removable article-supporting elements. To this end, extending between the chains at spaced intervals are a series of supporting racks and since these rack units are duplicates the description of one unit will suffice. Referring more particularly to Figs. 8-10, a hanger rod 60 has its ends mounted in opposite links of the chains to form part of the conveyor means. On the rod are spacer bushings 61 located between the chains and adjustably fixed collars 62. The article-supporting rack comprises a cross bar 63 and end pieces 64, the cross bar being secured to oblique lower edges of the end pieces. In the front edge of each end piece is an open-faced polydirectional slot 65 having at the top an arcuate bearing portion 66 for taking over the hanger rod 60. At the lower end, each end piece extends outwardly in the form of a lip 66$^a$. When the rack is hung on the hanger rod, by means of the bearing 66, it is free to pivot thereon, end play being prevented by the fixed collars 62. This pivotal mounting permits the rack to keep, by gravity, a normal position as the chains travel through their tortuous path, and permits the rocking or tilting movements hereinafter referred to. The substantial normal position of the rack, which may vary slightly in different units, is shown in Fig. 6 and Fig. 3.

The construction described also permits the rack to be removed upon a polydirectional movement thereof with respect to the hanger rod. That is, the rack is first moved in a direction to enable the rod-receiving or bearing portions of the slots to clear the rod. Then, by a movement in a direction at an angle to the first movement, the rack is moved away from the rod, the rod passing through the open faces of the slots. Fig. 9 shows, in full lines, the normal position of the rack. The broken lines indicate the rack shifted upwardly and to the left so that the bearing portions of the slots can clear the rod. The rack is now free to be moved away from the rod by a left and slightly downwardly movement. It will be noted, however, that the rack cannot be removed without polydirectional movement because for no unidirectional movement will the bearing portions of the slots clear the rod. The rack is replaced, as will be apparent, by a reversal of the polydirectional movement described.

In connection with the removably and pivotally mounted supporting rack there is provided releasable means for normally preventing removal of the rack. With the type of rack above described this may be accomplished by normally preventing the initial removing movement of the rack, i. e. the movement of the bearing portions 66 of the slots away from the rods. This movement is prevented by cooperating stop elements on the rack and conveyor, at least one being displaceable from stopping relation. Although capable of various constructions, in that here shown as an example, slidable on the rod 60 (Figs. 8-10) are two stop blocks in the form of round washers or collars 67. Extending upwardly from the cross bar 63 of the rack is a flange 68 having its upper edge formed with a central low point 69 and two end stop shoulders 70 (Fig. 8). In latching position the blocks 67 are located at or near the ends of the rod 60 and opposite the stop shoulders 70. A tendency of the rack to move in the initial direction above described brings the shoulders 70 and blocks 67 into engagement before such initial movement can be completed. Consequently, as long as the stop blocks are so located the rack cannot be removed. As the stop blocks 67 are symmetrical with respect to the hanger rod, the action is the same no matter in what angular position the rack may be located on its pivot. To enable the rack to be removed, the stop blocks 67 are slid inwardly along the rod until they are opposite the low portion 69 of the flange 68, as shown in the broken line position of Fig. 8. This portion is cut down far enough to permit the initial movement of the rack without engaging the stop blocks. The construction described provides an effective holding means for the racks and one that is quickly and readily released to permit removal of the racks, frequent removals being desirable for cleaning and other purposes.

There is provided means for firmly supporting the articles on the racks and in a manner to permit ready loading and unloading. This may be accomplished by a plurality of article-engaging fingers the tips of which are located in more than one straight line, at least one finger being movable and having a spring tending to press it into article-engaging position. The embodiment here illustrated is designed for the coating of articles of the type which may be termed shells, that is, articles having a body portion and a rim or side wall. The particular articles here shown are round box parts, e. g. the upper or lower half of a round brass box. In coating such articles, the shells may be supported by hangers consisting of three fingers, the tips of which take into the corner or crevice formed between the shell body and rim.

Although capable of various constructions, in that here shown as an example, each rack carries a plurality of hanger units. As these units are duplicates the description of one unit will suffice. Removably secured to the crossbar 63 by bolts 71 is a spaced plate 72. Clamped against the crossbar by plate 72 is the looped end of a double pronged wire 73. Both prongs are bent downwardly at a substantial right angle. At the bottom, the ends of the prongs are bent upwardly at an obtuse angle, but in opposite directions (Figs. 8-9), to form two fixed fingers 74. Cooperating with the two fixed fingers 74 is a movable finger 75. This is formed by a wire 76 which has a straight portion slidable in a thimble 77 secured in a hole in plate 72 by having its rim turned down thereagainst and extending through a suitable hole in the crossbar 63. Beyond the thimble the wire 77 is bent outwardly and then downwardly (Fig. 9) and at the outer end is bent sharply upwardly to form the finger 75. All three of the fingers have pointed tips to take into the crevice between the bottom and rim of the shell 80, and the tips lie in the circumference of the circle, providing a three-point support for the box. On the wire 77 of the movable finger is an abutment nut 78 and between this nut and plate 72 is a coiled spring 79. This spring tends to pull movable finger 75 away from the other two, the movement being limited by the bend in the wire (Fig. 9).

To load a shell onto a hanger unit, the movable finger is moved inwardly against the spring toward the other fingers, until a shell can span the three finger tips and hook over the same. This may be done by hooking the shell rim over finger 75 and pulling down thereon until the opposite side of the rim can take over the fingers 74, or by pressing down on nut 78 to move the finger 75 to loading position. When the parts are released, spring 79 pulls the movable finger into article-supporting position. That is, in the present instance, the spring tends to pull the movable finger away from the other two, thus firmly holding the shell on the hanger.

In the embodiment illustrated the fingers are so arranged that, in the normal position of the rack (Fig. 9) the shell is positioned to have an interior angle of approximately 50° to the horizontal. And as the racks pivot by gravity to hang in normal position, except when shifted, as elsewhere described, the shell normally has this angular position during the course of its travel.

As shown in Fig. 1, in the present embodiment, the tank 26 is located just inside the opening by which the racks enter the dipping chamber, the front end of the tank, which has a slanting entrance wall (Figs. 1 and 3), being below the near side of the sprockets 35. The tank is so located that as the racks move down around sprockets 35 the shells 80 are submerged in the lacquer bath contained in the tank. As will be apparent from Fig. 3, due to the normal position of the shell supports, the shells enter the bath edgewise and with a minimum resistance.

Any suitable means may be provided for maintaining a substantially constant bath level, for example the means described in the parent application referred to.

The tank has a bottom pipe 97, normally closed, for drainage purposes when it is desired to empty the tank. The end wall of the housing 22 below the entrance opening is hinged at 98 (Fig. 1) and may be swung out of the way to permit a cover to be placed on the tank during brief shutdowns.

To avoid an unnecessary amount of lacquer in the tank, the tank has a false bottom 99 substantially parallel to the slant of the chains.

In order to release the entrapped air above referred to, the position of the shell is shifted while in the bath to permit the air to escape. To this end, below one of the sprockets 35, and a short distance inside the entrance end of the tank, is a cam track 101. This cam engages lugs 102 on the lips 66ª of the rack end pieces. The cam is so arranged that by its engagement with lug 102, the rack is tilted on its pivot to swing the supported shell backwards to a substantially vertical or past-vertical position. Fig. 3 shows a unit just approaching the cam 101. Fig. 4 shows a unit being tilted and approaching air-releasing position. As the rack continues its travel the lug 102 rides off cam 101 and the rack swings back to normal position. This tilting or flip of the shells in the bath permits any entrapped air to escape from the shells and pass out through the bath to the surface. As a result the dry spots referred to are eliminated.

As the rack leaves sprockets 35 and travels up the slant toward sprockets 36, the shells are withdrawn from the bath and the rate of emergence is regulable in order that it may be made to accord with the rate of lacquer flow, as above described. The rate of emergence may be changed by changing the speed of the chains; by changing the slant thereof; or by changing the supports to vary the angular position of the shells. As the shells emerge the excess lacquer drains off leaving a coating or film. This film, being still fluent, tends to flow by gravity downward on the faces of the shells. If the lacquer were permitted to set in this condition an uneven coating might result. There is provided means for causing the position of the withdrawn articles to be reversed with respect to the horizontal, thereby to reverse the gravitational flow of the lacquer film, and in constructions embodying the invention to the best advantage the articles are rocked back and forth across the horizontal to periodically reverse the lacquer flow while the lacquer retains substantial fluency. While this reversing may be accomplished in various ways, it may conveniently be done by rocking a supporting rack, such as that described, on its pivot in such a manner as to rock the shells across the horizontal. Although capable of various constructions, in that here shown as an example, paralleling the path of each conveyor chain on its upward slant from the tank is a cam bar 110. Each cam bar 110 has a recurrent series of high cam curves 111 facing the tank and positioned to engage the approaching cam rider pins 83 on the rack end pieces. As the cam riders 83 engage the first high cam surfaces 111 the cams cause the rack to swing around on its pivot until the shells have reversed their position with respect to the horizontal. That is, the shells are turned end for end so that the points formerly at the bottom are now at the top. This position is illustrated in Fig. 5. Owing to this reversal the gravitational flow of the lacquer is now in the opposite direction and thus the lacquer is spread in an even film.

Beyond the high curves 111 each cam bar has a recurrent series of low cam curves 112. After leaving the first high curves 111 the cam riders 83 ride down the subsequent low curves 112, being held to the cams by the gravity swing of the rack, and the rack is returned to substantially its former position. This swings the shells back across the horizontal to substantially the position of emergence (Fig. 6) thus again reversing the gravitational flow of the lacquer film. It will now be apparent that this rocking of the rack is repeated for each unit of the recurrent series.

There is provided means for holding the shells between rocking movements and in carrying out the invention to what is now considered the best advantage the shells are held a longer interval in the position opposite the position of emergence. Although capable of various constructions, in that here shown as an example, between the high cam curves 111 and the low or return curves 112, are high flats 113 over which the pins 83 ride after attaining the crests of the high curves. These flats hold the racks in displaced position a given interval which is sufficient to allow the lacquer film to overcome inertia and start to reverse its flow. In the present embodiment, with a chain speed of about two feet per minute, the high flats hold the shells reversed for approximately two seconds. Between each low or return cam curve and the next high curve are low flats 114 whereby the shells are held in the position of emergence a given interval again to give time for the lacquer film to reverse its flow. In the present embodiment, the low flats 114 are slightly shorter than the high flats 113 so that the shells are held in the position of emergence slightly less than two seconds. When the shells emerge from the bath there is a slight concentration of lacquer on the lower part of the shells. To equalize the film and compensate for this condition, the shells are held longer in the position to permit more flow away from the points of concentration. The periods of holding may be controlled by substituting cam bars having flats of different lengths.

As a given rack progresses the shells are periodically rocked through recurrent cycles duplicating the one described. The rocking is preferably continued until the lacquer film has set sufficiently to have no substantial fluency. In the present embodiment the cam bars have six units.

With the construction described the lacquer film is evenly spread over the faces of the shells and results in an even coating.

In order to prevent sagging of the chains and to position the cam riders 83 properly, paralleling the cam bars 110 are supporting tracks 115 on which the chains ride.

From the end of the rocking cams the chains pass up around the sprockets 36 and take an upward vertical path to the entrance of the drying chamber. While the lacquer film has no substantial fluency by the time the rocking operations are completed, in order to prevent any chance of creep of the film during what may be termed the preliminary setting period, there is provided means for holding the shells in a horizontal position during their travel from the rocking station to the drying chamber. This may be accomplished by cam means for engaging part of the rack to so tilt the same that the shells have horizontal position.

As here shown as an example, beyond the final low points 112 the cam bars 110 have cam curves 117 which are engaged by the cam riders 83. By this engagement a rack is tipped sufficiently to swing the supported shells upwardly into a substantially horizontal position. Beyond each cam curve 117 is a high flat 118 for holding the rack in this tilted position. This flat extends (Fig. 15) to a point about below the axis of sprocket 36 where the cam riders are taken by a curved bar spring 119. These cam springs 119 are, in effect, continuations of flats 118 and are made in spring form to be yieldable in case of a jam.

Since the holding cam track formed by the end of bar 110 and spring extension 119 engages the outer portions of cam riders 83, it cannot function beyond a certain point in the upward curve because it ceases to take hold. There is provided a second cam track 120 paralleling and offset from the first cam track so as to engage the cam riders 83 from within, i. e. it is between the cam riders and the rack pivot. This cam is arranged to take hold before the first one lets go so that the racks are maintained in their tilted position.

In order to effect transfer from one cam to another without jar or the like and to avoid the necessity of providing exact overlap between the two cams, there is provided a movable extension on cam 120 with a spring tending to hold it in a slightly overthrown position. Although capable of various constructions, in that here shown as an example, pivoted to cam element 120 is a cam extension 121 (Figs. 11, 12) extending inwardly and downwardly to overlap cam element 119. On the extension 121 is a pin 122 to which is connected a spring 123. The other end of this spring is anchored to a pin 124. The spring tends to draw the cam extension toward cam element 119 and permits movement in the opposite direction. Movement in either direction is limited by the ends of a slot 126 in a bracket 127 and in which pin 122 rides.

In normal position (Fig. 11) the spring pulls the extension 121 far enough toward cam element 119 to be beyond the position for taking the cam riders, i. e. it is slightly overthrown. The extension overlaps cam element 119 sufficiently to take hold before the latter lets go. As a rack travels around pulleys 36, the cam extensions 122 are engaged by cam riders 83 and are displaced against their springs into a position where they become, in effect, continuations of cams 121. With this construction the inner cams take hold before the outer cams let go and the transfer is effected without jar.

At sprockets 37 the chains enter the drying chamber and take the zig-zag course above described. This gives plenty of time for the lacquer to dry and finally set.

There is provided means for heating the drying chamber and temperature controlled means for regulating the heat supply to maintain a substantially constant temperature. Although capable of various constructions, in that here shown as an example, in the drying chamber are a number of steam pipe heating units 131. Each unit comprises a series of reverse bends transverse the chamber. Steam is supplied by a main 132 to which the units are suitably connected. The units are similarly connected to an exhaust main 133. In the live steam main 132 is a U-shaped connection 134 in which is a steam control valve 135 automatically operated in accordance with the temperature of the drying chamber. To this end, as here illustrated, connected to the steam 136 of valve 135 is a valve lever 137 the free end of which is connected to a chain 138 running over pulleys 139, 140 and having its ends connected to cranks 141, 142 on a motor 143. The latter has a three wire connection with a thermostat 144, the thermometer bulb 145 of which extends into the drying chamber.

The thermostat device and motor operated valve above referred to are, in themselves, well known elements and no detailed description is necessary.

When the temperature of the drying chamber exceeds a given degree, fixed by the setting of the thermostat, a circuit is closed to cause the motor to operate in a manner to cause the chain 138 to depress lever 137 and close valve 135, thus shutting off the steam. When the temperature of the drying chamber falls below the critical point another circuit is closed to cause a reverse action to open valve 135 and admit steam.

A by-pass 146 extends across the U-shaped connection 134 and in the by-pass is a hand valve 147 for controlling the steam supply by hand if desired.

There is provided means for controlling the temperature of the bath and this may be accomplished by controlling the temperature of the dipping chamber. In the exemplification illustrated the dipping chamber is heated from the relatively hotter drying chamber and a certain amount of cool air enters the conveyor entrance. In the upper walls or roof of the drying chamber are adjustable dampers 160, 161. By opening these dampers to a greater or less extent the temperature of the drying chamber may be reduced accordingly and by closing them it may be raised.

As a rack passes up around sprockets 41 it leaves the drying chamber and takes the upward slant above referred to, which forms an unloading station. While the rack is passing up this slant an attendant removes the finished shells. This may be accomplished conveniently by pushing the movable hanger finger 75 inwardly. This causes the movable finger to approach the other two so that the box shell is free to be lifted off.

After leaving the unloading station the chains and supports pass idly across the top of the frame (Fig. 1) to the starting point, i. e. sprockets 34.

While the operation of the apparatus will be clear from the above description, to review the same: the chains moving as described, a given rack passes downwardly from sprockets 34 past the loading station. While the rack is passing the loading station, the shells are hung on the hanger fingers as above described. The supported shells are submerged in the bath and then withdrawn therefrom at a rate of emergence substantially equal to the rate of lacquer flow on the emerging shells. The rate of emergence is fixed by the chain speed, the angle of its path, and the angular position of the shells. In the apparatus shown the shells are positioned at an angle of about 50° to the horizontal; the path of the chains in leaving the tank is at an angle of about 10° to the horizontal and a convenient chain speed is about two feet per minute. This gives a certain rate of emergence and the viscosity of the bath is regulated to give a corresponding rate of flow.

While the rate of emergence may be regulated, to accord with different lacquers, by varying one or more of the factors above mentioned, for a given apparatus it is considered more practicable to regulate the rate of lacquer flow. The bath may be thinned or thickened by adding or subtracting any suitable thinning material and the temperature may be regulated as above described. Since the temperature of the drying chamber is maintained substantially constant, the dipping chamber and bath temperatures will remain substantially constant under constant exterior conditions. Upon a change in exterior conditions, e. g. in room temperature, the dampers 160, 161 are operated to maintain the proper temperature of the dipping chamber. A dipping chamber temperature to give a bath temperature of about 80° F. has been found suitable.

As the rack leaves the tank it is rocked by cams 110, as above described, to rock the shells back and forth across the horizontal, thus spreading the still fluent lacquer in an even film. Then the rack is tilted by cam curves 117 into a position such that the shells are substantially horizontal and is held in this position by cam elements 118, 119, 120. The rack, in this position, is conveyed up around sprockets 36 and upward to the entrance to the drying chamber. The position described prevents any creep of the lacquer film on the faces of the shells during the preliminary setting period and aids in the setting by moving the outer faces of the shells face-on toward the hot air from the drying chamber.

At sprockets 37, the rack enters the drying chamber and takes a zig-zag course through the same. By the resulting heat treatment the shells are dried and the lacquer film is finally set. Leaving the drying chamber, the rack passes upwardly past the unloading station. The rack now passes idly across the top of the frame to the starting point.

It will be understood that the chains carry a considerable number of duplicate rack units and that the operation is the same for each successive unit. To simplify the illustration only a few of the units have been shown. In Fig. 1 only one unit is indicated. In Fig. 2 several units are indicated but only the racks themselves are shown the fingers and associate parts being removed from cross bars 63 for convenience of illustration. In Figs. 3–7, while only a few units are shown in full, these figures indicate the spaced hanger rods 60, it being understood that each hanger rod carries a rack unit.

The method described makes possible a product having an even, uniform coating and at the same time the coating may be accomplished at such a speed as to make possible quantity production that is commercially economical.

What is claimed is:

1. The method of coating articles with lacquer or the like, which comprises submerging the articles in a bath of the coating material, withdrawing the articles from the bath at a rate of emergence substantially the same as the rate of drain of the lacquer from the emerging articles, reversing the position of the articles with respect to the horizontal after complete withdrawal from the bath, thereby to reverse the direction of drain of the lacquer on the articles, and drying.

2. The method of coating articles with lacquer or the like, which comprises submerging the articles in a bath of the coating material, withdrawing the articles from the bath at a rate of emergence substantially the same as the rate of drain of the lacquer from the emerging articles, rocking the articles back and forth across the horizontal after complete withdrawal from the bath to periodically reverse the direction of drain of the lacquer on the articles, and drying.

3. The method of coating articles with lacquer or the like, which comprises submerging the articles in a bath of the coating material, withdrawing the articles from the bath at a rate of emergence substantially the same as the rate of drain of the lacquer from the emerging articles, rocking the articles back and forth across the horizontal after complete withdrawal from the bath to periodically reverse the direction of drain of the lacquer on the articles, holding the articles horizontal during a preliminary setting period, and drying.

4. The method of coating articles with lacquer or the like, which comprises submerging the articles in a bath of the coating material, withdrawing the articles from the bath at an angle to the horizontal, reversing the position of the withdrawn articles with respect to the horizontal after complete withdrawal from the bath, thereby to reverse the direction of drain of the lacquer film, and drying.

5. The method of coating articles with lacquer or the like, which comprises submerging the articles in a bath of the coating material, withdrawing the articles from the bath at an angle to the horizontal, rocking the withdrawn articles back and forth across the horizontal after complete withdrawal from the bath to periodically reverse the direction of drain of the lacquer film, and drying.

6. The method of coating articles with lacquer or the like, which comprises submerging the articles in a bath of the coating material, withdrawing the articles from the bath at an angle to the horizontal, rocking the withdrawn articles across the horizontal after complete withdrawal from the bath, thereby to reverse the direction of drain of the lacquer film, holding the articles in a horizontal position during a preliminary setting period, and drying.

7. The method of coating articles with lacquer or the like which comprises submerging the articles in a bath of the coating material, and withdrawing the articles from the bath at a low angle to the horizontal and at a rate of emergence substantially the same as the rate of drain of the lacquer from the emerging articles.

8. The method of coating articles with lacquer or the like which comprises submerging the articles in a bath of the coating material, withdrawing the articles from the bath at a low angle to the horizontal and at a rate of emergence substantially the same as the rate of drain of the lacquer from the emerging articles, and rocking the articles after complete withdrawal from the bath back and forth across the horizontal alternately to incline the articles at angles above and below the horizontal.

In testimony whereof, we have hereunto set our hands.

JAMES S. GEORGE.
ROGER S. SPERRY.

CERTIFICATE OF CORRECTION.

Patent No. 1,783,188.   Granted December 2, 1930, to

JAMES S. GEORGE ET AL.

It is hereby certified that error appears in the printed specification of the above numbered patent requiring correction as follows: Page 8, strike out lines 11 to 18, comprising claim 7, and line 19, for claim numeral "8" read 7; and that the said Letters Patent should be read with this correction therein that the same may conform to the record of the case in the Patent Office.

Signed and sealed this 31st day of March, A. D. 1931.

(Seal)

M. J. Moore,
Acting Commissioner of Patents.